(12) United States Patent
Clark et al.

(10) Patent No.: US 11,623,493 B2
(45) Date of Patent: Apr. 11, 2023

(54) VEHICLE SUSPENSION SYSTEM

(71) Applicant: Terex South Dakota, Inc., Watertown, SD (US)

(72) Inventors: Brian Clark, Seattle, WA (US); Miles Alton, Bothell, WA (US)

(73) Assignee: Terex South Dakota, Inc., Watertown, SD (US)

(*) Notice: Subject to any disclaimer, the term of this patent is extended or adjusted under 35 U.S.C. 154(b) by 202 days.

(21) Appl. No.: 17/089,016

(22) Filed: Nov. 4, 2020

(65) Prior Publication Data

US 2022/0134829 A1    May 5, 2022

(51) Int. Cl.

| | |
|---|---|
| *B60G 17/016* | (2006.01) |
| *B60G 17/019* | (2006.01) |
| *B60G 17/015* | (2006.01) |
| *F16K 31/06* | (2006.01) |
| *B66F 13/00* | (2006.01) |
| *B66F 11/04* | (2006.01) |

(52) U.S. Cl.
CPC ....... *B60G 17/016* (2013.01); *B60G 17/0152* (2013.01); *B60G 17/01933* (2013.01); *F16K 31/0603* (2013.01); *B60G 2202/413* (2013.01); *B60G 2204/62* (2013.01); *B60G 2300/00* (2013.01); *B60G 2400/204* (2013.01); *B66F 11/042* (2013.01); *B66F 11/046* (2013.01); *B66F 13/00* (2013.01)

(58) Field of Classification Search
CPC .............. B60G 17/016; B60G 17/0152; B60G 17/01933; B60G 2202/413; B60G 2204/62; B60G 2300/00; B60G 2400/204; F16K 31/0603; B66F 11/042; B66F 11/046; B66F 13/00

USPC ..................... 280/124.157, 124.158, 124.159
See application file for complete search history.

(56) References Cited

U.S. PATENT DOCUMENTS

| | | | |
|---|---|---|---|
| 5,069,302 A | * 12/1991 | Kageyama | ............ B60T 8/4809 180/197 |
| 5,447,331 A | 9/1995 | Barnhart | |
| 5,639,119 A | 6/1997 | Plate et al. | |
| 6,719,098 B1 | 4/2004 | Ishikawa et al. | |
| 6,761,371 B1 | * 7/2004 | Heyring | ................. B60G 21/06 280/124.159 |
| 7,543,671 B2 | 6/2009 | Donaldson | |

(Continued)

OTHER PUBLICATIONS

International Search Report and Written Opinion for Application No. PCT/US21/58044, dated Jan. 31, 2022, 14 pages.

(Continued)

*Primary Examiner* — Toan C To
(74) *Attorney, Agent, or Firm* — Brooks Kushman P.C.

(57) ABSTRACT

A suspension system for a land vehicle is provided with at least one actuator connected to a chassis and an axle of a land vehicle spaced apart from a pivotal connection of the axle. A suspension circuit is in cooperation with the at least one actuator. A controller is in operable communication with the suspension circuit and is programmed to receive input indicative of a travel speed of the land vehicle. The suspension circuit is closed at a low speed travel range to permit the axle to pivot in response to variations in an underlying support surface. The suspension circuit is opened to permit selective actuation of the at least one actuator at a higher speed travel range in response to variations in the underlying support surface.

8 Claims, 5 Drawing Sheets

(56) References Cited

U.S. PATENT DOCUMENTS

| | | | |
|---|---|---|---|
| 7,963,528 B2 | 6/2011 | North et al. | |
| 8,276,705 B2 * | 10/2012 | Sumiyoshi | E02F 9/02 |
| | | | 188/152 |
| 9,020,698 B2 * | 4/2015 | Iwami | B60G 17/0152 |
| | | | 701/37 |
| 10,251,344 B2 | 4/2019 | Fay, II et al. | |
| 11,192,424 B2 * | 12/2021 | Tabata | B60G 21/0551 |
| 2009/0020966 A1 * | 1/2009 | Germain | B60G 21/0555 |
| | | | 280/124.106 |
| 2013/0090808 A1 * | 4/2013 | Lemme | B60G 17/0432 |
| | | | 280/124.159 |
| 2014/0379215 A1 * | 12/2014 | Kikuchi | B60G 17/018 |
| | | | 701/37 |
| 2016/0200164 A1 * | 7/2016 | Tabata | B60G 21/073 |
| | | | 280/5.508 |

OTHER PUBLICATIONS

Office Action for U.S. Appl. No. 17/477,026, dated Sep. 2, 2022, 7 pages.
International Preliminary Report on Patentability for Application No. PCT/US2021/058044, dated Dec. 29, 2022, 5 pages.

\* cited by examiner

VEHICLE SUSPENSION SYSTEM

TECHNICAL FIELD

Various embodiments relate to suspension systems for land vehicles.

BACKGROUND

U.S. Pat. No. 5,447,331 issued to Genie Industries, Inc., on Sep. 5, 1995 for a Vehicle Axle Oscillation System with Positive Ground Contact, which discloses a fluid suspension system for a land vehicle.

SUMMARY

According to at least one embodiment, a fluid suspension system for a land vehicle is provided with at least one actuator adapted to be connected to a chassis and an axle of a land vehicle spaced apart from a pivotal connection of the axle. A fluid pressure circuit is in cooperation with the at least one actuator. A controller is in operable communication with the fluid pressure circuit and is programmed to receive input indicative of a travel speed of the land vehicle. The fluid pressure circuit is closed at a low speed travel range to limit fluid flow rate to permit the axle to pivot in response to variations in an underlying support surface. The fluid pressure circuit is opened and the at least one actuator is selectively actuated at a higher speed travel range in response to variations in the underlying support surface.

According to a further embodiment, the axle is further defined as a first axle. The fluid suspension system is further provided with a flow control valve in fluid cooperation with the fluid pressure circuit and a second axle that is pivotally connected to the chassis.

According to an even further embodiment, a solenoid valve is in fluid cooperation with a pressurized fluid source and the flow control valve.

According to an even further embodiment, the solenoid valve is closed in response to the low speed travel range.

According to an even further embodiment, the solenoid valve is opened in response to the higher speed travel range.

According to another even further embodiment, a flow limit is in fluid cooperation with the pressurized fluid source and the flow control valve.

According to a further embodiment, the flow limit is in parallel fluid communication with the solenoid valve.

According to another further embodiment, the solenoid valve is a normally open valve.

According to another further embodiment, the solenoid valve is a normally closed valve.

According to another embodiment a land vehicle is provided with a chassis. An axle is pivotally connected to the chassis about a horizontal axis perpendicular to the axle. A pair of wheels is mounted to the axle and spaced apart with the pivotal connection therebetween to support the axle and the chassis for travel upon an underlying support surface. At least one actuator is connected to the chassis and the axle spaced apart from the pivotal connection. A fluid pressure circuit is in cooperation with the at least one actuator. A controller is in operable communication with the fluid pressure circuit, and is programmed to receive input indicative of a travel speed of the land vehicle. The fluid pressure circuit is closed at a low speed travel range to limit fluid flow rate to permit the axle to pivot in response to variations in the underlying support surface. The fluid pressure circuit is opened and the at least one actuator is selectively actuated at a higher speed travel range in response to variations in the underlying support surface.

According to a further embodiment, a speed sensor cooperates with the land vehicle to determine the travel speed of the land vehicle and is in communication with the controller to provide the input indicative of the travel speed.

According to another further embodiment, the axle is further defined as a first axle. A second axle is pivotally connected to the chassis about the horizontal axis perpendicular to the second axle and spaced apart from the first axle. A second pair of wheels is mounted to the second axle and spaced apart with the pivotal connection of the second axle and the chassis therebetween to support the second axle and the chassis for travel upon the underlying support surface. A flow control valve is in fluid cooperation with the fluid pressure circuit and the second axle.

According to a further embodiment, a solenoid valve is in fluid cooperation with a pressurized fluid source and the flow control valve.

According to a further embodiment, a flow limit is in fluid cooperation with the pressurized fluid source and the flow control valve.

According to a further embodiment, the flow limit is in parallel fluid communication with the solenoid valve.

According to an embodiment a land vehicle is provided with a chassis. A first axle is pivotally connected to the chassis about a horizontal axis perpendicular to the first axle. A second axle is pivotally connected to the chassis about the horizontal axis perpendicular to the second axle and spaced apart from the first axle. A first pair of wheels is mounted to the first axle and spaced apart with the pivotal connection of the first axle and the chassis therebetween to support the first axle and the chassis for travel upon an underlying support surface. A second pair of wheels is mounted to the second axle and spaced apart with the pivotal connection of the second axle and the chassis therebetween to support the second axle and the chassis for travel upon the underlying support surface. A speed sensor determines a travel speed of the land vehicle. A pressurized fluid source is provided. A first actuator is connected to the chassis and the first axle spaced apart from the pivotal connection. A second actuator is connected to the chassis and the first axle spaced apart from the pivotal connection and the first actuator. A flow control valve is in fluid cooperation with the second axle. A solenoid valve is in fluid cooperation with the pressurized fluid source, and the flow control valve. A flow limit is in fluid cooperation with the pressurized fluid source and the flow control valve. The fluid cooperation of the flow limit is parallel to the solenoid valve. A controller is in operable communication with the solenoid valve and programmed to receive input indicative of the travel speed of the land vehicle from the speed sensor. The solenoid valve is closed at a low speed travel range to limit fluid flow rate to permit the first axle to pivot in response to variations in the underlying support surface. The solenoid valve is opened, and the first actuator and the second actuator are selectively actuated at a higher speed travel range in response to variations in the underlying support surface.

According to another embodiment, a suspension system for a land vehicle is provided with at least one actuator adapted to be connected to a chassis and an axle of a land vehicle spaced apart from a pivotal connection of the axle. A suspension circuit is in cooperation with the at least one actuator. A controller is in operable communication with the suspension circuit and is programmed to receive input indicative of a travel speed of the land vehicle. The at least one actuator is selectively actuated in proportion to the travel speed of the land vehicle, at a higher speed travel range in response to variations in the underlying support surface.

According to a further embodiment, the at least one actuator further includes an electromechanical actuator.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Aerial lift assemblies provide an operator platform on a linkage assembly that pivots and/or translates to lift the operator platform to an elevated worksite. Conventional aerial lift assemblies include various adjustable structures to lift an operator platform to a height for performing a work operation. The aerial lift assemblies often include a stack linkage assembly. The aerial lift assemblies often include an articulated boom assembly, which may be provided by a four-bar linkage mechanism or an extending riser type linkage. Aerial lift assemblies are often provided on land vehicles for transportation of operator platform to the worksite.

Figure 1:
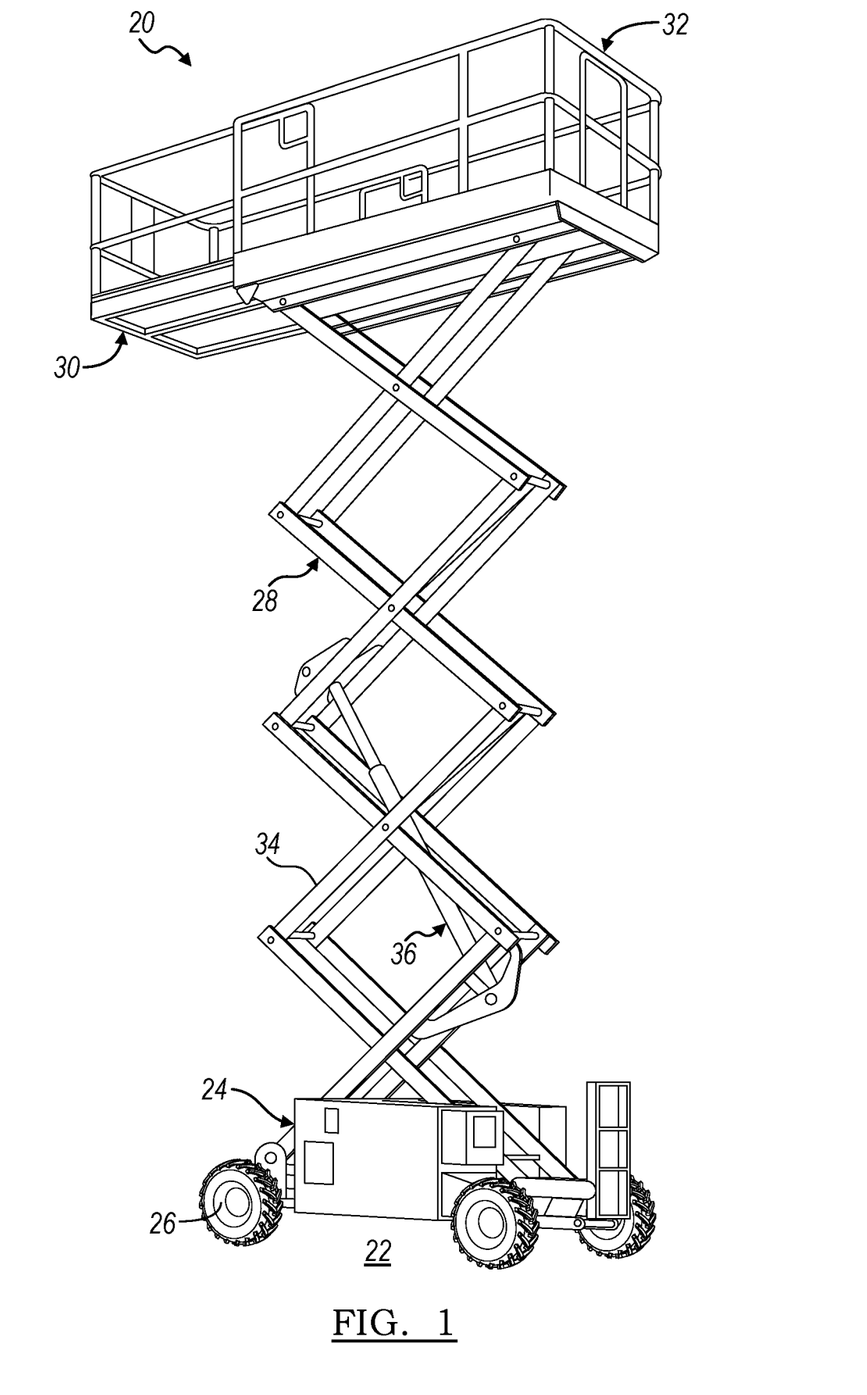
FIG. 1 is a perspective of an aerial lift vehicle according to an embodiment, illustrated in a partially extended position.

FIG. 1 illustrates an aerial lift assembly 20 according to an embodiment. The aerial lift assembly 20 is a mobile aerial lift assembly 20 as a land vehicle, which is collapsible for transportation upon an underlying support surface 22, such as the ground or a floor (FIG. 1). The aerial lift assembly 20 is also transportable for towing and transport upon a trailer behind a truck. The aerial lift assembly 20 is expandable by operator control to lift an operator to an elevated worksite. The aerial lift assembly 20 is discussed with relation to the ground 22. Therefore, terms such as upper, lower, and other height related terms are relative to height from the ground 22 are not to limit the aerial lift assembly 20 to ground 22 specific applications.

The aerial lift assembly 20 includes a lift structure that provides significant stability and performance characteristics by elevating a worker to an advantageous position for reach while providing stability. The aerial lift assembly 20 includes a chassis 24 to support the aerial lift assembly 20 upon the ground 22 or any support surface. The chassis 24 is supported upon a plurality of wheels 26 that contact the ground 22. A linkage assembly 28 is connected to the chassis 24 to extend and retract from the chassis 24. A platform 30 is provided on the linkage assembly 28 to extend and retract from the chassis 24. The platform 30 includes perimeter railing 32 extending upward from the platform 30 to enclose an operator workspace upon the platform 30.

The aerial lift assembly 20 is utilized to lift the platform 30 and workers to elevated work locations to perform work operations. The linkage assembly 28 is a stack linkage assembly 28, with a series of pivotally connected stack links 34 that retract to collapse and stack upon the chassis 24 for compactness for storage and transportation. The aerial lift assembly 20 also includes an actuator assembly 36 to extend and retract the linkage assembly 28 and consequently, extend and retract the platform 30.

Figure 2:
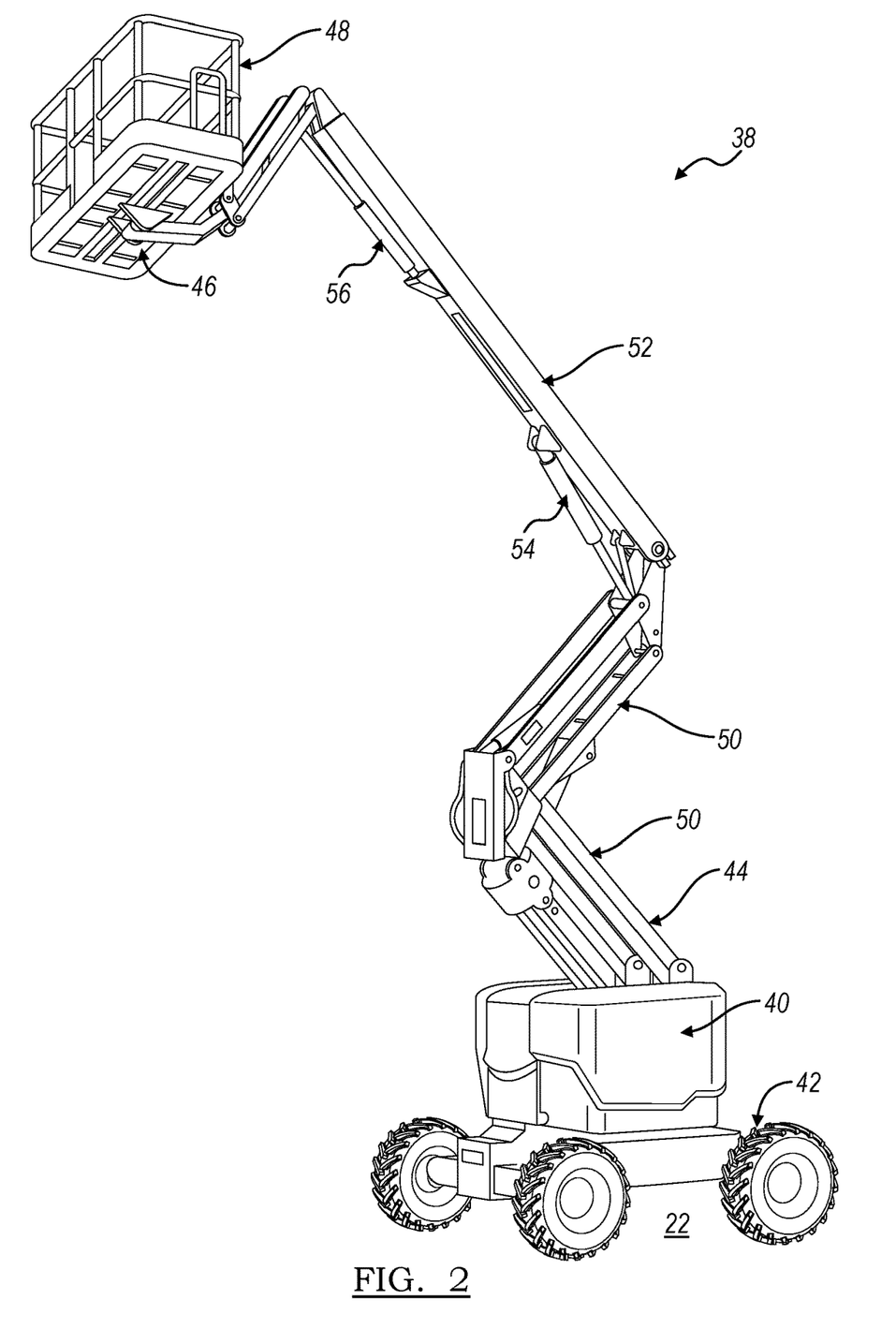
FIG. 2 is a perspective view of an aerial lift vehicle according to another embodiment, illustrated partially extended.

FIG. 2 illustrates an aerial lift assembly 38 according to another embodiment. The aerial lift assembly 38 includes a chassis 40 to support the aerial lift assembly 38 upon the ground 22. The chassis 40 is supported upon a plurality of wheels 42 that contact the ground 22 for support and mobility of the aerial lift assembly 38. A linkage assembly 44 is connected to the chassis 40 to extend and retract from the chassis 40. A platform 46 is provided on the linkage assembly 44 with a perimeter railing 48. The linkage assembly 44 includes a plurality of four bar linkages 50 with an extendable boom 52. Actuator assemblies 54 are provided to pivot the four bar linkages 50 and the extendable boom 52. An actuator assembly 56 is provided to extend the boom 52.

Figure 3:
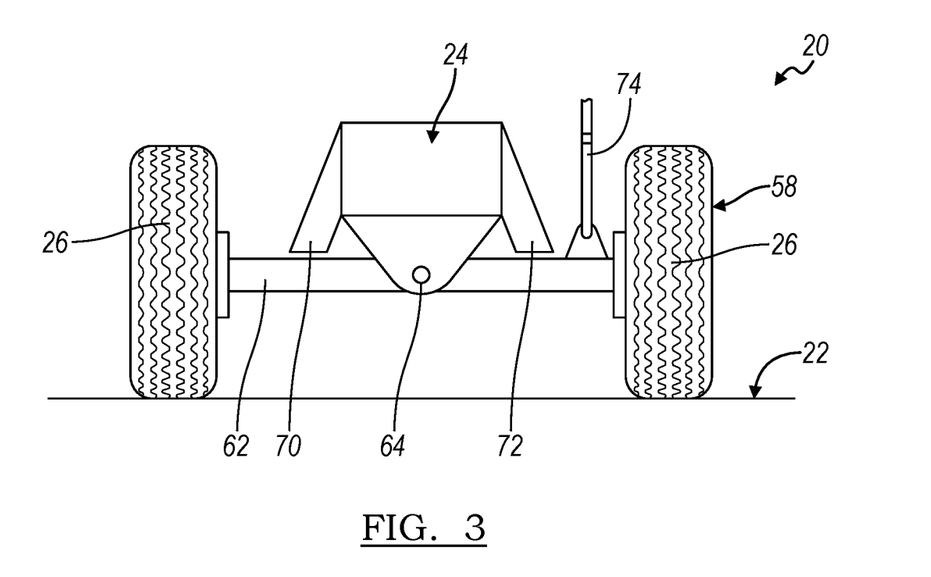
FIG. 3 is a schematic end view of an axle assembly of a land vehicle according to another embodiment.
Figure 4:
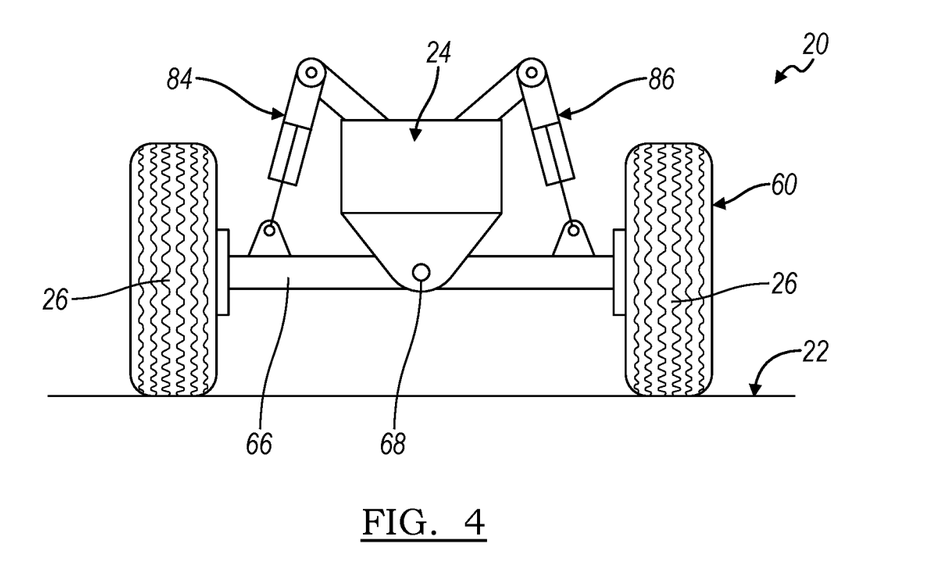
FIG. 4 is a schematic end view of another axle assembly of the land vehicle of FIG. 3.

FIG. 3 illustrates an end view of an axle assembly 58 of the land vehicle 20, which may be a rear axle assembly 58 according to an embodiment. FIG. 4 illustrates an end view of an axle assembly 60 of the land vehicle 20, which may a front axle assembly 60. The chassis 24 is supported upon the pair of axle assemblies 58, 60. The chassis 24 is pivotally connected to a rear axle 62 of the rear axle assembly 58 at a rear pivot pin 64. The rear pivot pin 64 is located centrally upon the rear axle 62 and is oriented horizontally in a fore and aft travel direction of the land vehicle 20, which is perpendicular to the rear axle 62. The chassis 24 is pivotally connected to a front axle 66 of the front axle assembly 60 at a front pivot pin 68. The front pivot pin 68 is located centrally upon the front axle 66 and is also oriented horizontally in the fore and aft travel direction of the land vehicle 20, which is perpendicular to the front axle 66. The front axle assembly 60 may be steerable, as is known in the art. The wheels 26 are mounted for rotation upon the axle assemblies 58, 60 to support the axle assemblies 58, 60 upon the ground 22. Some of, or all of, the wheels 26 may be driven by a motor or a plurality of motors, as is known in the art.

The pivoting of the axle assemblies 58, 60 permits a suspension of the land vehicle 20 to maintain contact of the wheels 26 with the ground 22 as the wheels 26 traverse inconsistencies on the ground 22. The pivoting axle assemblies 58, 60 is often referred to as an oscillation suspension system. One function of the oscillation suspension system is to maintain ground contact normal force to prevent loss of traction. Another function of the oscillation suspension system is to prevent any of the wheels 26 from lifting significantly off the ground 22, which is undesirable because changes in terrain can cause rock-over onto the lifted wheel 26 when the projected center of gravity crosses a diagonal line between wheels 26 on opposite corners of the land vehicle 20.

Pivoting of the rear axle assembly 58 is limited in the angular pivot range. For example, the rear axle assembly 58 may be permitted to pivot about one degree in either angular direction. Hard stops 70, 72 are provided on the chassis 24 and extend toward the rear axle 62. As the rear axle assembly 58 approaches inconsistencies on the ground 22, the rear axle 62 can be pivoted in either direction until contact with one of the hard stops 70, 72, thereby limiting the pivoting of the pivot range. The suspension system cooperates with the front and rear axle assemblies 58, 60 to adjust the front axle assembly 60 in response to the pivoting of the rear axle assembly 58. The adjustment may cooperate such that if one of the stops 70, 72 is engaged by the rear axle 62, the front axle 66 is pivoted in a reverse angular direction to balance the land vehicle 20.

Pivoting of the right or left pivoting direction of the rear axle 62 is sensed by the suspension system. An input link 74 is pivotally connected to the rear axle 62 to translate as the rear axle 62 pivots. The input link 74 cooperates with the suspension system so that the translation of the input link 74 is detected by the suspension system.

Figure 5:
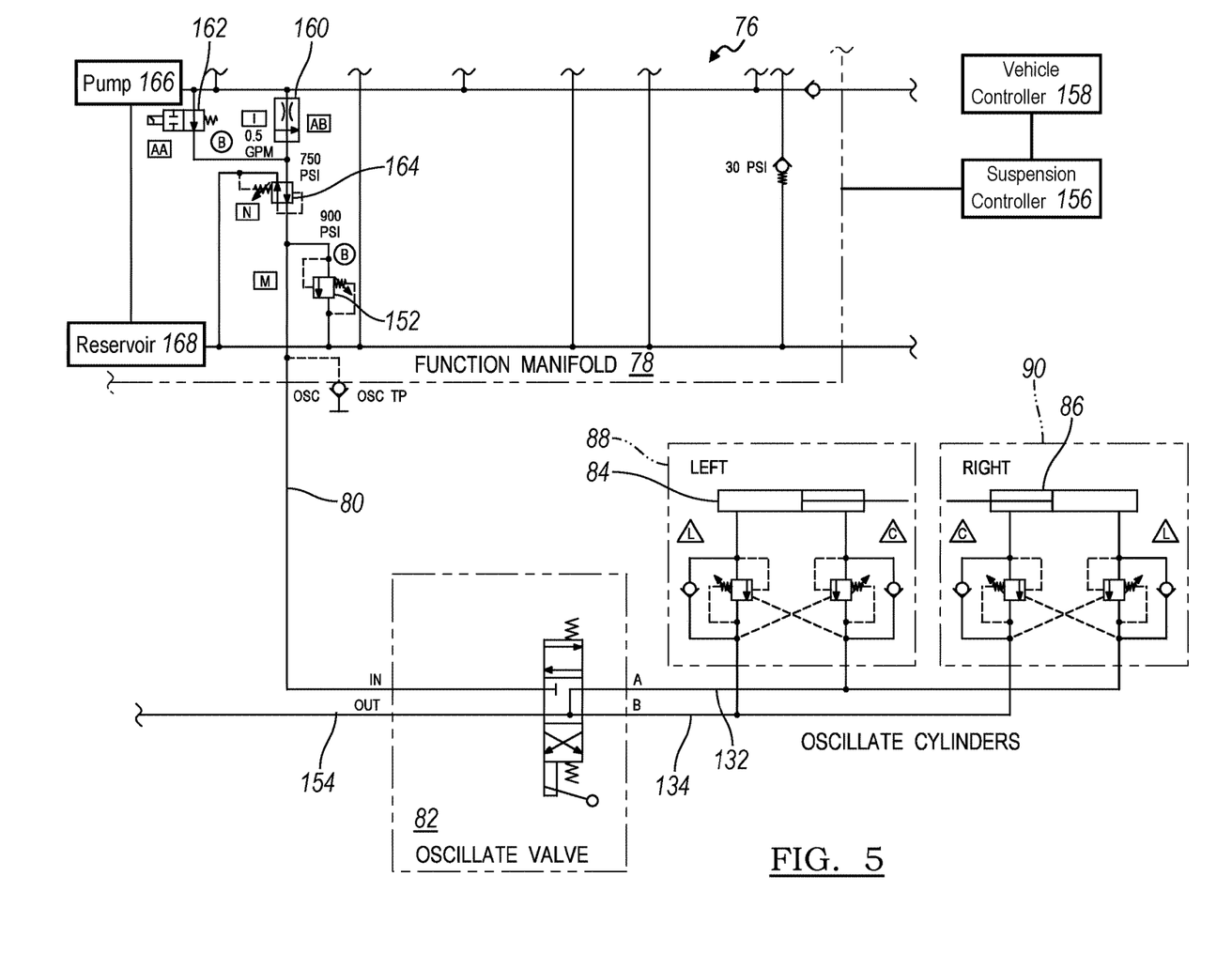
FIG. 5 is a fluid circuit diagram of the land vehicle of FIG. 3.

FIG. 5 illustrates a portion of the suspension system 76 as a circuit diagram. According to one embodiment, the suspension system 76 is a fluid suspension system 76. According to another embodiment, the suspension system 76 is a hydraulic suspension system 76. The hydraulic suspension system 76 receives pressurized hydraulic fluid from a function manifold 78. An infeed line 80 provides the fluid communication of the hydraulic fluid from the function manifold 78 to the hydraulic suspension system 76.

Referring to FIG. 5, the hydraulic suspension system 76 includes a flow control valve, referred to as an oscillate valve 82. The input link 74 of the rear axle assembly 58 of FIG. 3 is connected to the oscillate valve 82. The oscillate valve 82 detects the pivot direction of the rear axle 62 based upon the translation of the input link 74. The oscillate valve 82 is a directional control valve unit with a neutral partly extended position when the rear axle 62 is in a balanced position. In the neutral position, the oscillate valve does not direct flow. Further extension of the input link 74 indicates one pivotal direction, permitting flow in one direction. Retraction of the input link 74 from the neutral position indicates pivoting in the opposite direction, thereby permitting fluid flow in another direction. Although one input link 74 is illustrated and described, any number of input links 74 may be employed.

Referring again to FIG. 4, a pair of actuators 84, 86 are provided on the front axle 66. According to an embodiment, the actuators 84, 86 are hydraulic cylinder actuators 84, 86. Each of the hydraulic cylinder actuators 84, 86 is pivotally connected to the front axle 66 and the chassis 24, and are spaced apart with the chassis 24 therebetween. According to another embodiment, each of the actuators 84, 86 are electromechanical actuators, such as ball screw assemblies, or the like. According to another embodiment, any number of actuators 84, 86 may be employed, such as one actuator.

The oscillate valve 82 controls flow between the function manifold circuit 78 and oscillate cylinder circuits 88, 90, each in cooperation with one of the hydraulic cylinder actuators 84, 86. The oscillate cylinder circuits 88, 90 are illustrated in greater detail in FIG. 6. Each oscillate cylinder circuit 88, 90 includes a pair of lock valves 92, 94, 96, 98. Each lock valve 92, 94, 96, 98 is in parallel with a respective check valve 100, 102, 104, 106 located in a bypass line 108, 110, 112, 114. The lock valves 92, 94, 96, 98 are pilot-operated and shifted to a flow-through position in opposition of included return springs by pressurization of respective crossover pilot lines 116, 118, 120, 122. Bleed lines 124, 126, 128, 130 are provided at the spring end of the lock valves 92, 94, 96, 98 to bleed off any oil leakage in the lock valves 92, 94, 96, 98.

Figure 6:
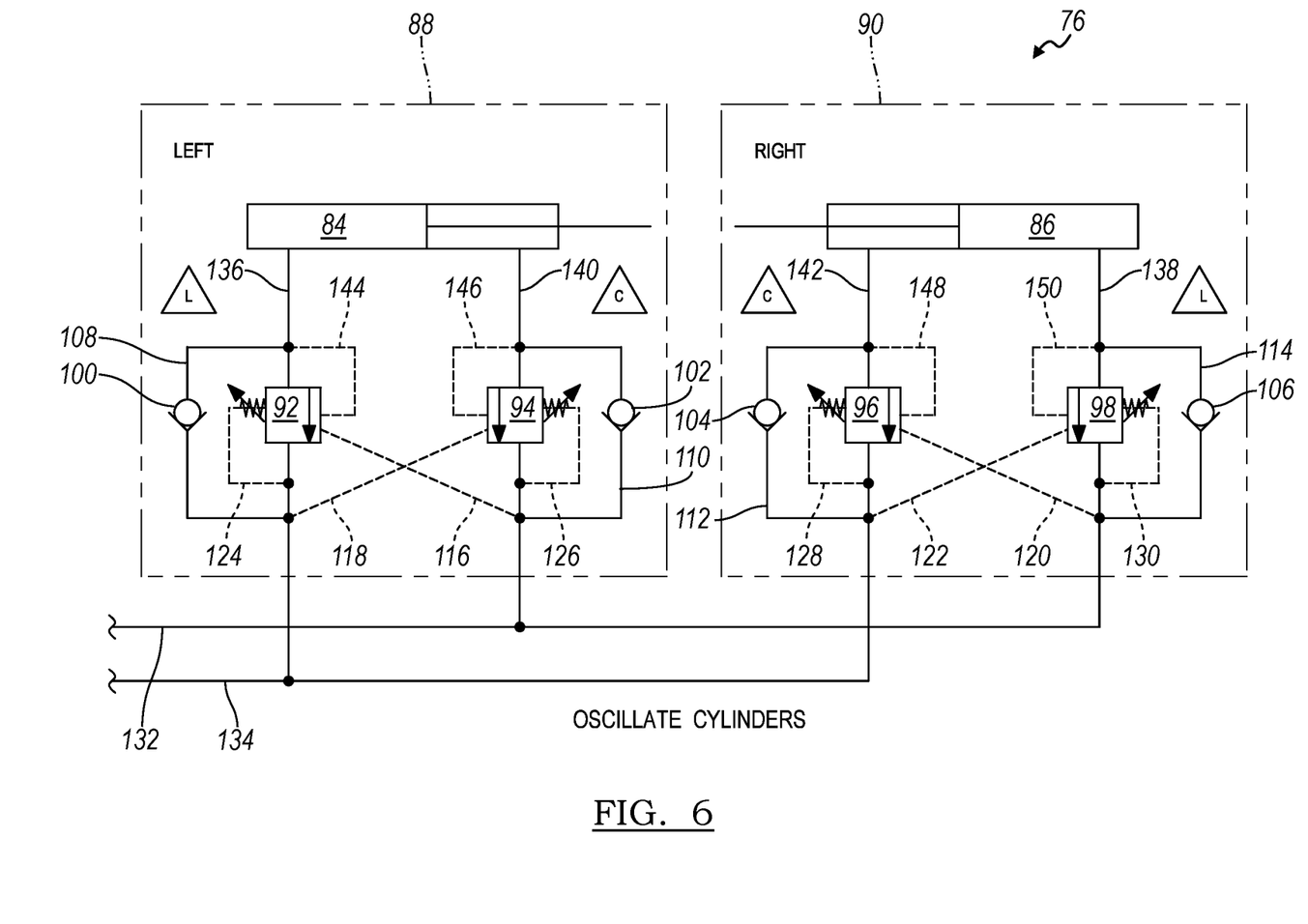
FIG. 6 is an enlarged portion of the fluid circuit diagram of FIG. 5.

As illustrated in FIGS. 5 and 6, flow lines 132, 134 connect the lock valves 92, 94, 96, 98 and the oscillate valve 82. Referring now to FIG. 6, input flow line 132 connected to lock valves 94, 98 and output flow line 134 is connected to lock valves 92, 96. Flow lines 136, 138 connect lock valves 92, 98 to the cylinder ends of the hydraulic cylinder actuators 84, 86. Flow lines 140, 142 connect the rod ends of the hydraulic cylinder actuators 84, 86 to lock valves 94, 96. In case of undue pressure build-up in the system because of unusual thermal conditions, thermal release lines 144, 146, 148, 150 connect lines 136, 140, 142, 138 respectively to the lock valves 92, 94, 96, 98 to open the lock valves 92, 94, 96, 98 sufficiently to relieve excess pressure in the hydraulic cylinder actuators 84, 86.

Referring again to FIG. 5, the function manifold 78 is connected to a pump 166 and a reservoir 168. The function manifold 78 includes a pressure relief valve 152 in parallel with the infeed line 80. In the depicted embodiment, the pressure relief valve 152 relieves hydraulic pressure exceeding 900 pounds per square inch (psi) back to reservoir 168 within the function manifold 78.

The oscillate valve 82 functions, when not in its centered blocking position, to connect the pressurized supply line 80 of the function manifold 78 with line 132 or 134 in the suspension system 76, and to simultaneously connect an outfeed line 154 with whichever of the lines 132 or 134 is not connected to the supply line 80. Referring again to FIG. 6, when line 132 is pressurized, the check valves 102, 106 are unseated and pressurized fluid flows through bypass lines 110, 114 and lines 140, 138 to retract hydraulic cylinder actuator 84 and extend hydraulic cylinder actuator 86. Simultaneously, flow from line 132 moves through crossover pilot lines 116, 120 to cause lock valves 92, 96 to open. When this occurs, the fluid in the cylinder end of the hydraulic cylinder actuator 84 and the fluid in the rod end of the hydraulic cylinder actuator 86 is returned along lines 136, 142, and line 134 to the oscillate valve 82 (FIG. 5) and the outfeed line 154 (also FIG. 5). Concurrently, and with reference again to FIG. 6, the rod end of hydraulic cylinder actuator 84 is charged from line 140, thereby retracting hydraulic cylinder actuator 84 as hydraulic cylinder actuator 86 is extended.

When the oscillate valve 82 is shifted in the opposite direction, so that the line 134 is connected by the oscillate valve 82 with the infeed line 80 rather than with the outfeed line 154, and so that the line 134 is connected by the oscillate valve 82 with the outfeed line 154 rather than with the infeed line 80, the result is that check valves 100, 104 are unseated and pressurized fluid flows through bypass lines 108, 112 and lines 136, 142 to extend hydraulic cylinder actuator 84 and retract hydraulic cylinder actuator 86. Simultaneously, flow from line 134 moves through crossover pilot lines 118, 122 to cause lock valves 94, 98 to open. When this occurs, the fluid in the rod end of the hydraulic cylinder actuator 84 and the fluid in the cylinder end of the hydraulic cylinder actuator 86 is returned along lines 140, 138, and line 132 to the oscillate valve 82 (FIG. 5) and the outfeed line 154 (also FIG. 5). Concurrently, and with reference again to FIG. 6, the cylinder end of hydraulic cylinder actuator 84 is charged from line 136, thereby extending hydraulic cylinder actuator 84 as hydraulic cylinder actuator 86 is retracted.

The hydraulic suspension system 76 is suitable for balancing the land vehicle 20 at certain speeds. The oscillate function permits all four wheels 26 to maintain contact with the ground 22 to maintain stability. At low speeds, the settling of the suspension system 76 may not keep up with the vehicle dynamics, which may cause discomfort for an operator. Low speeds may be 0.5 miles per hour (mph) and under or even slower, such as 0.3 mph and under. These low speed control dynamics occur when the retracting hydraulic cylinder actuator 84, or 86 is placed under high load while the land vehicle 20 drives very slowly (0.3 mph and under, or 0.5 mph and under) over an obstacle. When the oscillate valve 82 is opened, the hydraulic cylinder actuators 84, 86 extend or retract quickly, but there is a hysteresis delay before the oscillate valve 82 closes again, resulting in a jump in position and inertia imparted to the lift structure of the land vehicle 20. When the land vehicle 20 is travelling at higher speeds (greater than 0.3 mph or greater than 0.5 mph), the oscillation motion is not significantly faster than required by the terrain so that the oscillation system cannot overshoot and cause dynamics, while the oscillate valve 82 remains open. At the low drive speeds, the oscillation exceeds the speeds required to keep up with terrain, and overshoots and closes the oscillate valve 82, which then opens again with forward motion, resulting in an uncomfortable cyclic motion.

With reference again to FIG. 5, a suspension controller 156 is provided. The suspension controller 156 is in electrical communication with a vehicle controller 158 of the land vehicle 20. The suspension controller 156 may be embodied within the vehicle controller 158 according to an alternative embodiment. The vehicle controller 158 provides a vehicle travel speed to the suspension controller 156. The vehicle controller 158 may provide the vehicle travel speed from a speed sensor on the land vehicle 20. The land vehicle 20 may employ an open loop control system with a hydrostatic drive for monitoring the vehicle travel speed. The land vehicle 20 may employ a closed loop control system with a motor speed sensor, such as an electric motor drive. The suspension controller 156 is also in electrical communication with the function manifold 78.

The function manifold 78 includes a fixed control valve 160 between the pressure source and the infeed line 80. The flow control valve 160 limits the flow, such as to a limit of 0.5 gallons per minute (GPM) according to an embodiment. The function manifold 78 also includes a normally open solenoid valve 162 in parallel with the flow control valve 160 and in fluid communication with the pressure fluid source and the infeed line 80. The valve 162 is in electrical communication with the controller 156. A pressure control relief valve 164 may also be provided on the infeed line 80 between the flow control valve 160, the switch valve 162 and the oscillate valve 82 to limit pressure to 750 psi according to an embodiment.

When the land vehicle 20 is traveling at the higher speed travel range, the switch valve 162 is left in the open position, thereby bypassing the flow control valve 160 and permitting the oscillate valve 82 to balance the axle assemblies 58, 60 as described above. The pressure source of the hydraulic fluid is approximately eight to nine GPM, thereby permitting a prompt oscillation response. However, when the land vehicle 20 is travelling at the low speed travel range, the suspension controller 156 closes the switch valve 162. When the switch valve 162 is closed, the fluid to the infeed line 80 is routed through the flow control valve 160, thereby limiting the rate of flow of the hydraulic fluid to 0.5 GPM. Under the limited flow, the balancing of the oscillate valve 82 is slowed to a comfortable rate that is commensurate with the travel speed. When the vehicle 20 returns to a higher travel speed, the suspension controller 156 discontinues closing the switch valve 162, thereby permitting the valve 162 to reopen for uninhibited oscillated balancing.

According to another embodiment, the switch valve 162 may be a normally closed valve 162 that is opened by the controller 156 at the higher speed travel range.

According to another embodiment, the flow circuit may be proportional to vehicle travel speed, instead of switching between two flow rates.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fluid suspension system for a land vehicle comprising:
    at least one actuator adapted to be connected to a chassis and a first axle of a land vehicle spaced apart from a pivotal connection of the first axle;
    a fluid pressure circuit in cooperation with the at least one actuator;
    a controller in operable communication with the fluid pressure circuit and programmed to:
        receive input indicative of a travel speed of the land vehicle,
        close the fluid pressure circuit to limit fluid flow rate at a low speed travel range to permit the first axle to pivot in response to variations in an underlying support surface, and
        open the fluid pressure circuit at a higher speed travel range for selective actuation of the at least one actuator in response to variations in the underlying support surface;
    a first flow control valve in fluid cooperation with the fluid pressure circuit and a second axle that is pivotally connected to the chassis;
    a solenoid valve in fluid cooperation with a pressurized fluid source and the first flow control valve; and
    a second flow control valve in series fluid cooperation with the pressurized fluid source and the first flow control valve, and in parallel fluid cooperation with the solenoid valve.

2. The fluid suspension system of claim 1 wherein the solenoid valve is closed in response to the low speed travel range.

3. The fluid suspension system of claim 2 wherein the solenoid valve is opened in response to the higher speed travel range.

4. The fluid suspension system of claim 1 wherein the solenoid valve is a normally open valve.

5. The fluid suspension system of claim 1 wherein the solenoid valve is a normally closed valve.

6. A land vehicle comprising:
    a chassis;
    a first pivotally connected to the chassis about a horizontal axis perpendicular to the first axle;
    a pair of wheels mounted to the first axle and spaced apart with the pivotal connection therebetween to support the first axle and the chassis for travel upon an underlying support surface; and
    at least one actuator connected to the chassis and the first axle spaced apart from the pivotal connection;

a fluid pressure circuit in cooperation with the at least one actuator; and a controller in operable communication with the fluid pressure circuit and programmed to:
receive input indicative of a travel speed of the land vehicle,
close the fluid pressure circuit to limit fluid flow rate at a low speed travel range to permit the first axle to pivot in response to variations in the underlying support surface, and
open the fluid pressure circuit at a higher speed travel range for selective actuation of the at least one actuator in response to variations in the underlying support surface;

a second axle pivotally connected to the chassis about the horizontal axis perpendicular to the second axle and spaced apart from the first axle;

a second pair of wheels mounted to the second axle and spaced apart with the pivotal connection of the second axle and the chassis therebetween to support the second axle and the chassis for travel upon the underlying support surface;

a first flow control valve in fluid cooperation with the fluid pressure circuit and the second axle;

a solenoid valve in fluid cooperation with a pressurized fluid source and the first flow control valve; and a second flow control valve in series fluid cooperation with the pressurized fluid source and the first flow control valve, and in parallel fluid cooperation with the solenoid valve.

7. The land vehicle of claim 6 further comprising a speed sensor cooperating with the land vehicle to determine the travel speed of the land vehicle, and in communication with the controller to provide the input indicative of the travel speed.

8. A land vehicle comprising:
a chassis;
a first axle pivotally connected to the chassis about a horizontal axis perpendicular to the first axle;
a second axle pivotally connected to the chassis about the horizontal axis perpendicular to the second axle and spaced apart from the first axle;

a first pair of wheels mounted to the first axle and spaced apart with the pivotal connection of the first axle and the chassis therebetween to support the first axle and the chassis for travel upon an underlying support surface;

a second pair of wheels mounted to the second axle and spaced apart with the pivotal connection of the second axle and the chassis therebetween to support the second axle and the chassis for travel upon the underlying support surface;

a speed sensor to determine a travel speed of the land vehicle;

a pressurized fluid source;

a first actuator connected to the chassis and the first axle spaced apart from the pivotal connection;

a second actuator connected to the chassis and the first axle spaced apart from the pivotal connection and the first actuator;

a first flow control valve in fluid cooperation with the second axle;

a solenoid valve in fluid cooperation with the pressurized fluid source, and the first flow control valve;

a second flow control valve in series fluid cooperation with the pressurized fluid source and the first flow control valve, the fluid cooperation of the second flow control valve being parallel to the solenoid valve; and a controller in operable communication with the solenoid valve and programmed to:
receive input indicative of the travel speed of the land vehicle from the speed sensor,
close the solenoid valve to limit fluid flow rate at a low speed travel range to permit the first axle to pivot in response to variations in the underlying support surface, and
open the solenoid valve and selectively actuate the first actuator and the second actuator at a higher speed travel range in response to variations in the underlying support surface.

* * * * *

UNITED STATES PATENT AND TRADEMARK OFFICE
CERTIFICATE OF CORRECTION

PATENT NO. : 11,623,493 B2
APPLICATION NO. : 17/089016
DATED : April 11, 2023
INVENTOR(S) : Brian Clark et al.

It is certified that error appears in the above-identified patent and that said Letters Patent is hereby corrected as shown below:

In the Claims

Column 8, Line 60, Claim 6:
After "a first"
Insert --axle--.

Signed and Sealed this
Sixth Day of June, 2023

Katherine Kelly Vidal
*Director of the United States Patent and Trademark Office*